United States Patent
Weindorf

(10) Patent No.: US 6,206,776 B1
(45) Date of Patent: Mar. 27, 2001

(54) VENTILATION DEVICE

(75) Inventor: Manfred Weindorf, Vaihingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/440,112

(22) Filed: Nov. 15, 1999

(30) Foreign Application Priority Data

Nov. 14, 1998 (DE) .............................................. 198 52 592

(51) Int. Cl.⁷ .................................................... B60H 1/00
(52) U.S. Cl. ............................................................ 454/143
(58) Field of Search ................................. 454/143, 145, 454/144, 124, 152

(56) References Cited

U.S. PATENT DOCUMENTS

| | | | |
|---|---|---|---|
| 4,878,420 | 11/1989 | Rübig et al. | 98/2.08 |
| 5,263,893 | 11/1993 | Hoffman et al. | 454/69 |
| 5,556,333 * | 9/1996 | Sigmund | 454/143 |

FOREIGN PATENT DOCUMENTS

| | | |
|---|---|---|
| 4338099 C2 | 8/1993 | (DE) . |
| 1085334 | 9/1967 | (GB) . |
| 1142118 | 2/1969 | (GB) . |

* cited by examiner

*Primary Examiner*—Harold Joyce
*Assistant Examiner*—Derek S. Boles
(74) *Attorney, Agent, or Firm*—Evenson, McKeown, Edwards & Lenahan, P.L.L.C.

(57) ABSTRACT

A ventilation system for the interior of a vehicle includes a housing comprising an air inlet; a first air outlet; and a second air outlet, which is arranged directly in front of the first air outlet; and a swivel flap arranged in the area of the air outlets. The second air outlet is arranged in a plane that is oriented at a right angle with respect to the plane of the first air outlet. For achieving an air deflection with a simultaneous air distribution within a narrow space, the housing has a third air outlet which is situated in a plane orthogonal to the planes of the other air outlets.

16 Claims, 4 Drawing Sheets

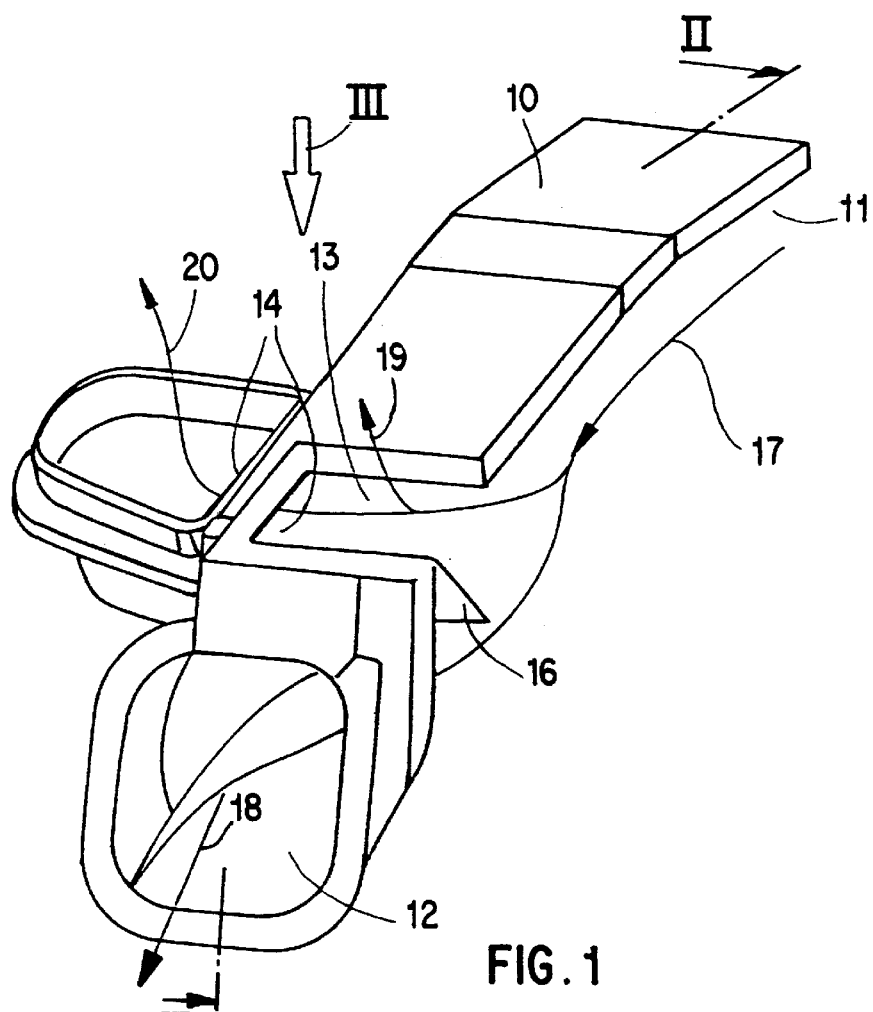
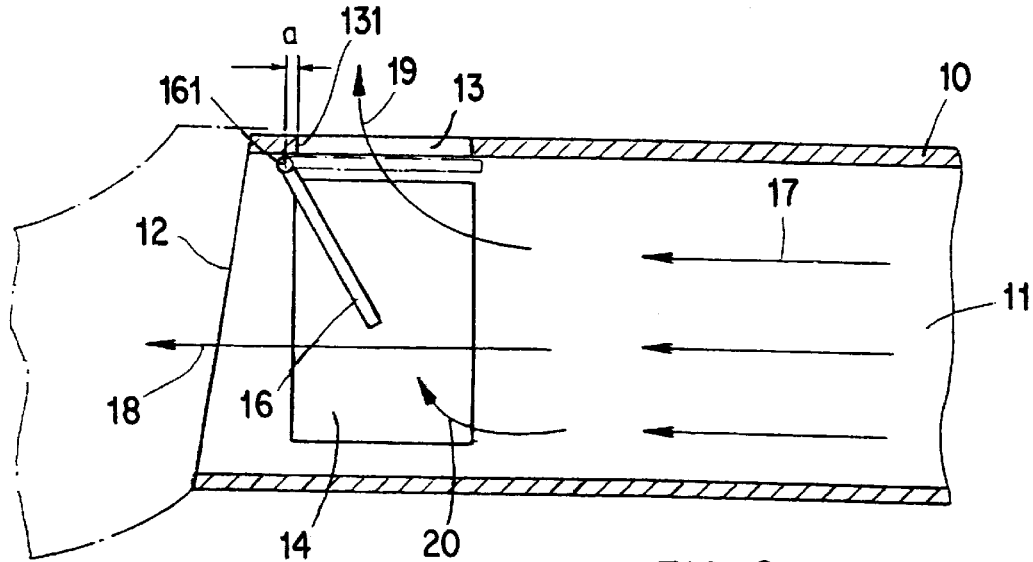

VENTILATION DEVICE

BACKGROUND AND SUMMARY OF INVENTION

This application claims the priority of German patent document 198 52 592.3, filed Nov. 14, 1998, the disclosure of which is expressly incorporated by reference herein.

The present invention relates to a ventilation system for the interior of a vehicle.

In the case of a known ventilation system disclosed in German Patent Document DE 43 38 099 C2, a first air outlet is connected with a center nozzle installed in the dashboard. The center nozzle is arranged in the vertical area of the dashboard for a direct flow against the front passengers. A second air outlet is connected with an air outlet surface which is perforated over a large surface and is arranged in the horizontal area of the dashboard. A swivel flap, which is assigned to the two air outlets, is perforated and is constructed such that, in one swivelling end position, it completely closes one air outlet and completely opens up the other air outlet. When the first air outlet is closed (i.e., the second air outlet is open), the air flows via the second air outlet and flows out of the top side of the dashboard as diffuse air, which flows along the windshield and causes no draft phenomena for the front passengers. Because of the perforation of the swivel flap, simultaneously a little air flows to the center nozzle and exits there as diffuse air which is used for promoting the ventilation which causes no draft for the front passengers. When the second air outlet is closed (i.e., the first air outlet is open), a close, direct ventilation of the front passengers takes place by way of the center nozzle because, as the result of the high air resistance of the perforation of the swivel flap, hardly any air flows via the second air outlet.

It is an object of the present invention to achieve, by means of a single swivel flap for several air outlets, in addition to the air diversion to the individual air outlets, a simultaneously distribution of air.

This object is achieved by the ventilation system according to the present invention. The ventilation system according to the present invention has the advantage that, as the result of the arrangement of the air outlets and the construction of the swivel flap, the air flowing in via the air inlet is divided into three air currents which flow out simultaneously via the three air outlets and, if desired, can be caused to be of the same volume by the corresponding arrangement of the swivel flap. By means of the swivel flap, the air current is slowed down, distributed and deflected by 90° respectively, and thus an air flow separation is achieved within an extreme small-volume space. As a result, the ventilation system as a whole can be constructed in a compact manner, which meets the constant demand for smaller space requirements.

The invention will be explained in detail by means of embodiments illustrated in the drawings. Other objects, advantages and novel features of the present invention will become apparent from the following detailed description of the invention when considered in conjunction with the accompanying drawings.

BRIEF DESCRIPTION OF THE DRAWINGS

FIG. 1 is a schematic view of a perspective representation of a ventilation system for a vehicle interior;

FIG. 2 is a schematic longitudinal sectional view of the ventilation system according to Line II—II in FIG. 1;

DETAILED DESCRIPTION OF THE DRAWINGS

Figure 3:
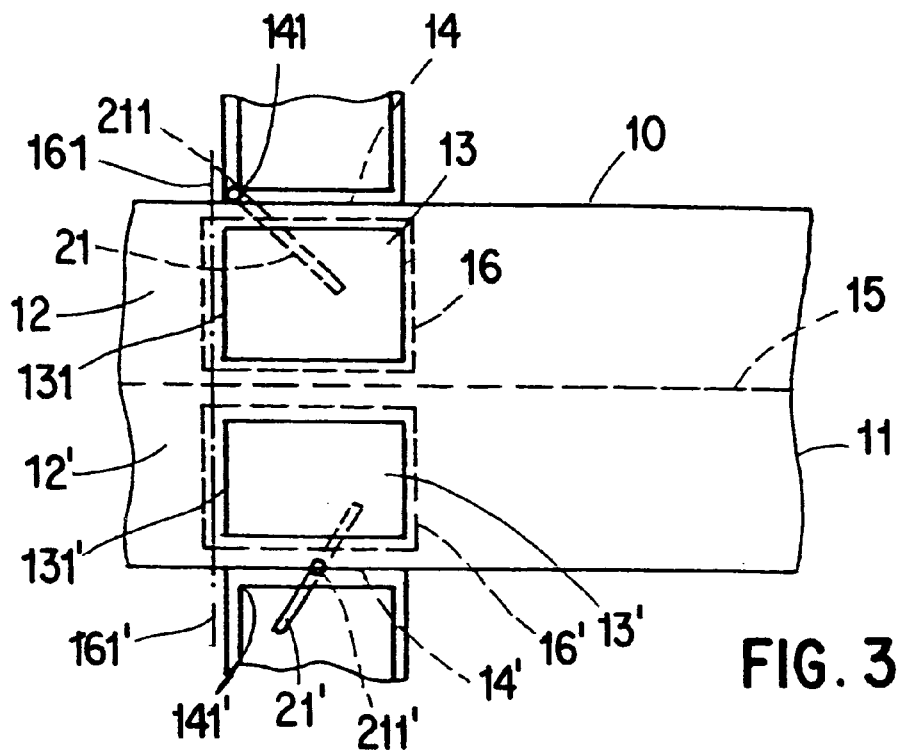
FIG. 3 is a schematic top view of the ventilation system in the direction of the arrow III in FIG. 1.

The ventilation system for a vehicle interior, which is illustrated in different views and sectional views of FIGS. 1 to 3, is conceived for the separate ventilation of the left and of the right part of the vehicle interior, in which case FIG. 1 shows only the part of the housing 10 for the ventilation of the driver side of the interior.

The housing 10 has an air inlet 11; a first air outlet 12; and a second air outlet 13, which, viewed in the air flow direction, is arranged directly in front of the first air outlet 12 and is arranged in a plane which is oriented at a right angle with respect to the plane of the first air outlet 12. The housing 10 also has a third air outlet 14 which, in the area of the two air outlets 12, 13, is situated in a plane which is orthogonal to the planes of the two air outlets 12, 13. In the area of the third air outlet 14, the housing 10 has a cup-shaped section that projects in a balcony-type manner and in which the air flowing out via the third air outlet 14 is deflected upward by approximately 90° (FIG. 1).

For the separate ventilation of the front passenger side of the interior, three air outlets 12'–14' are arranged in the housing 10 in an identical manner, specifically mirror-symmetrically to the housing axis coinciding with the normal line of the air inlet 11. A partition 15, which divides the housing 10 into two identical housing parts for ventilating the driver and the front passenger side of the interior, extends in the plane of the housing axis from the air inlet 11 to the two first air outlets 12, 12'. Both housing parts have an identical construction, so that only the left part of the housing 10 for the ventilation of the driver side, which is illustrated in FIG. 1, will be described in the following, but this description applies in the same manner to the right part of the housing 10.

In the area of the air outlets 12 to 14, a swivel flap 16 is arranged and constructed such that, in one swivelling end position, as illustrated in FIGS. 1 and 2, it only partially covers the opening cross-section of the first air outlet 12, preferably by 50%, and forms an air guiding element that points by means of its swivel end toward the air inlet 11 and deflects a portion of the air quantity flowing in via the air inlet 11 to the second and third air outlet 13, 14. In FIGS. 1 and 2, the division of the air current into the three partial flows flowing out via the air outlets 12 to 14 is symbolized by the arrows 17 to 20. The air current flowing in via the air inlet 11 has the reference number 17; the air current flowing out via the first air outlet 12 has the reference number 18; the air current flowing out via the second air outlet 13 has the reference number 19; and the air current flowing out via the third air outlet 14 has the reference number 20. By means of the suitable arrangement of the swivel flap 16, the three air currents 18, 19, 20 can have the same volume.

In the embodiment of FIGS. 1 to 3, the opening cross-sections of the air outlets 12 to 14 are rectangular, and the boundary edges are arranged orthogonally with respect to one another. The swivelling axis 161 of the swivel flap 16 is aligned in parallel to the boundary edge 131 of the second air outlet 13 facing the first air outlet 12 and is fixed at a small distance "a" from this boundary edge 131 on the housing 10 offset toward the first air outlet 12. In the illustrated embodiment, the distance "a" amounts to 0 to 5 mm. In its other swivelling end position, the swivel flap 16 completely covers the opening cross-section of the second air outlet 13, as illustrated by a dash-dotted line in FIG. 2.

Figure 6:
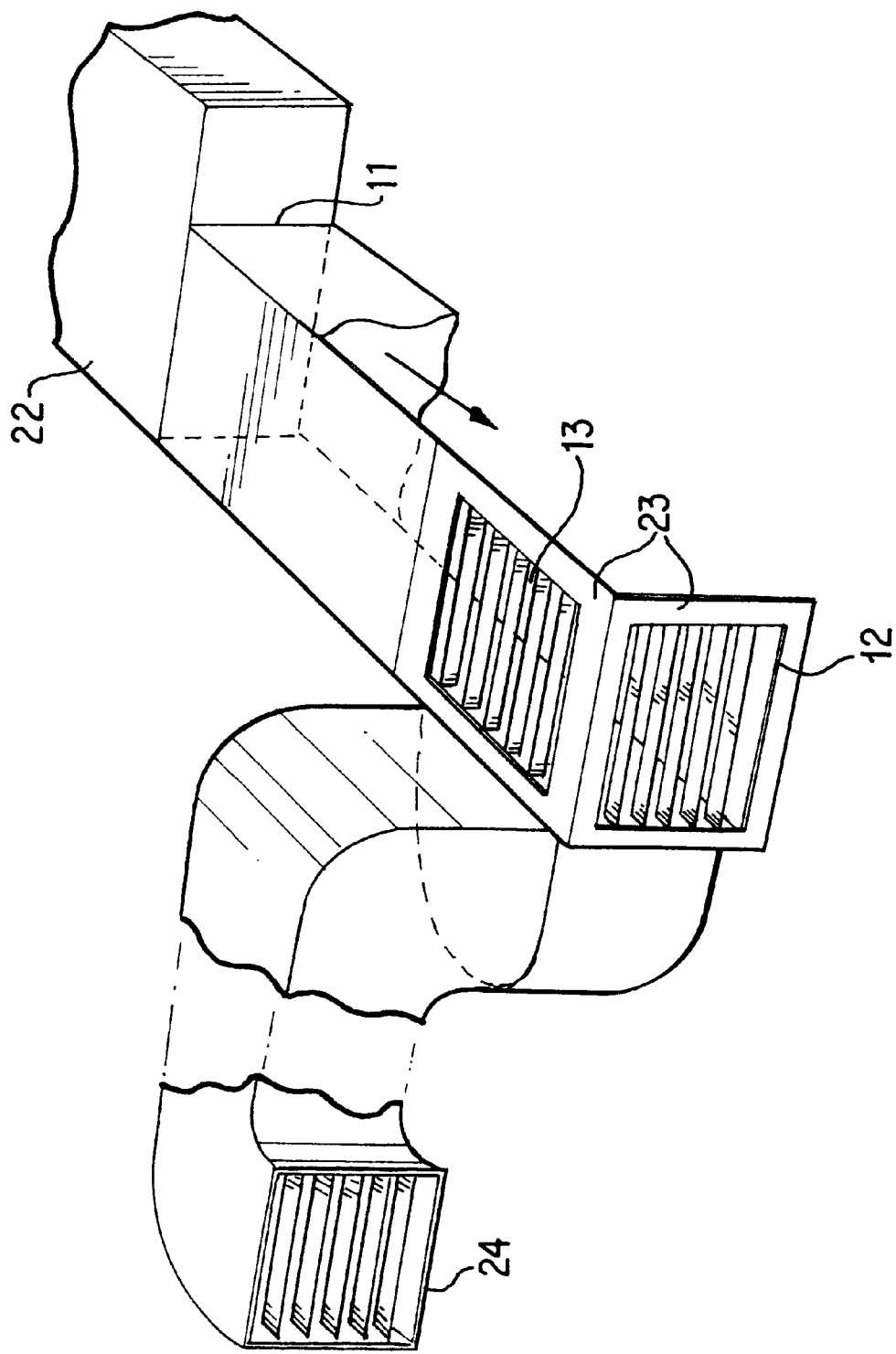
FIG. 6 is a schematic representation of the air outlets connected to a center nozzle and a lateral nozzle.

As shown in FIG. 6, the air inlet 11 is connected to an air supply duct (22); the first air outlet 12 is connected to a lower outflow opening of a center nozzle (23) integrated in the dashboard of the vehicle; the second air outlet 13 is connected to an upper outflow opening of the center nozzle; and the third air outlet 14 is connected to a lateral nozzle (24) also integrated in the dashboard.

An air flap 21 can also be assigned to the third air outlet 14 (FIG. 3) in order to additionally control the partial flow 20 flowing out via the air outlet 14. In this case, the distance "a" of the swivelling axis 161 of the swivel flap 16 from the boundary edge 131 of the second air outlet 13 amounts to 13 to 23 mm. The swivelling axis 211 of the additional air flap 21 extends in parallel to the boundary edge 141 of the third air outlet 14 facing the first air outlet 12 and is fixed to the housing 10. In this case, the swivelling axis may be situated directly on the boundary edge 141, as illustrated in FIG. 3 in the left housing part for ventilating the driver side of the vehicle interior, or may be arranged in the center in the air flap 21' and in the third air outlet 14', as illustrated in FIG. 3 in the right housing part for ventilating the front passenger side. In both cases, the swivelling axis 211 or 211' is arranged such that the air flap 21 or 21' for opening up the third air outlet 14 or 14' swivels into the interior of the housing 10 in the direction of the second air outlet 13 and 13'. In its closed position, the air flap 21 completely blocks the third air outlet 14.

Figure 4:
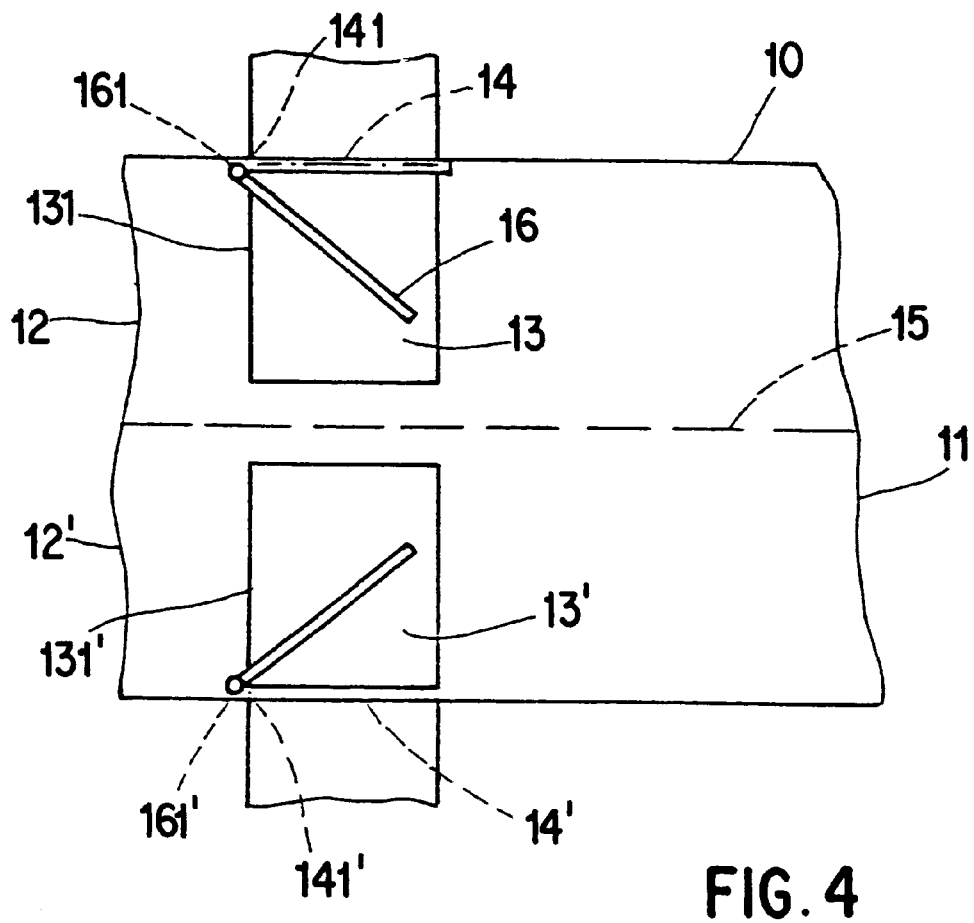
FIGS. 4 and 5 are the schematic representation as in FIG. 3 according to two additional embodiments.

The ventilation system schematically illustrated in FIG. 4 is modified with respect to the above-described ventilation system such that the swivelling shaft 161 of the swivel flap 16 is arranged to be rotated by 90° and extends in parallel to the boundary edge 141 of the third air outlet 14 facing the first air outlet 12. In this case, the swivelling axis 161 is again arranged at a short distance from this boundary edge 141 offset toward the first air outlet 12. In one swivelling end position, as illustrated in FIG. 4, the swivel flap 16 again forms an air guiding element which covers approximately half the opening cross-section of the first air outlet 12 and divides the air current into three partial air flows. In contrast, in its other end position, which is outlined in FIG. 4 by a dash-dotted line, the swivel flap 16 completely closes off the third air outlet 14. The same applies to the swivel flap 16' in the right housing part.

Figure 5:
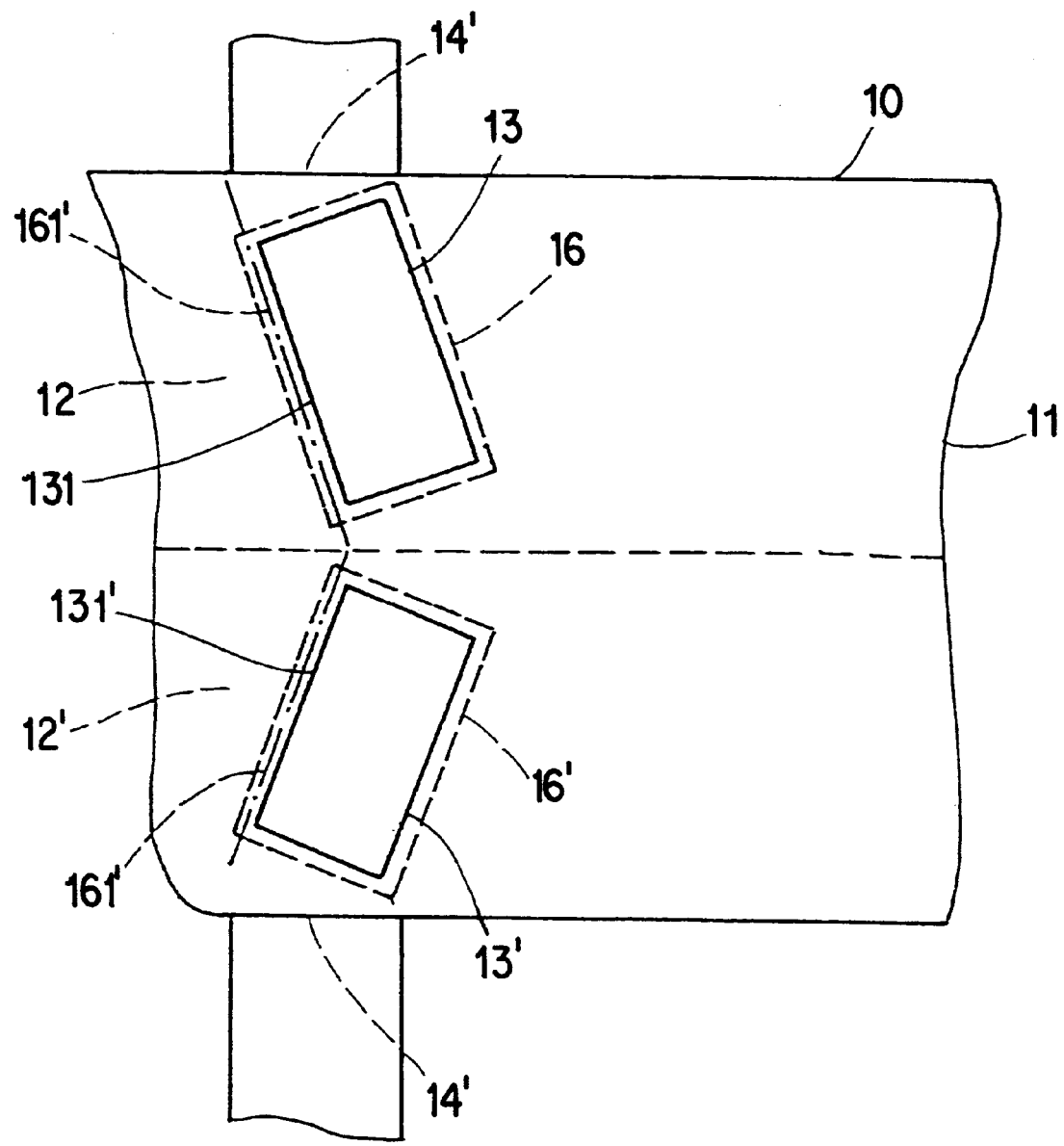

In the embodiment of the ventilation system according to FIG. 5, the opening cross-sections of the air outlets 12 to 14 are again rectangular, the boundary edges of the opening cross-sections of the first and the third air outlet 12 and 14 being oriented at a right angle or in parallel to one another. In contrast, the boundary edges of the opening cross-section of the second air outlet 13 extend at an acute angle with respect to the boundary edges of the two other air outlets 12 and 14. The swivelling axis 161 of the swivel flap 16 extends again in parallel to the boundary edge 131 of the second air outlet 13 facing the first air outlet 12. The same applies to the arrangement of the second air outlet 13' and the swivel flap 16' in the right housing part.

In the case of the described ventilation system, a separate ventilation of the driver side and the front passenger side may not be necessary. In this case, the partition 15 between the housing parts is eliminated. A first air outlet 12' and a second air outlet 13' may also be eliminated. The two third air outlets 14, 14' are maintained. All air outlets 12, 13, 14, 14' are controlled by means of a single air flap 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A ventilation system for the interior of a vehicle comprising a housing, said housing comprising:

an air inlet;

a first air outlet;

a second air outlet directly in front of the first air outlet, wherein said second air outlet is in a plane that is at a right angle to the plane of the first air outlet;

a third air outlet in a plane orthogonal to the planes of the first and the second air outlets; and a swivel flap;

wherein, in a first swivelling end position of the swivel flap, the swivel flap partially covers the opening cross-section of the first air outlet and its swivelling end points toward the air inlet, thereby deflecting a portion of air that flows from the air inlet to the first air outlet toward the second and third air outlets.

2. A system according to claim 1, wherein opening cross-sections of the air outlets are at a right angles and have boundary edges that are oriented orthogonally with respect to each another.

3. A system according to claim 1, wherein opening cross-sections of the air outlets are rectangular, wherein boundary edges of the opening cross-sections of the first and third air outlet are oriented at a right angle or in parallel to one another, and wherein boundary edges of the opening cross-section of the second air outlet are oriented at an acute angle thereto.

4. A system according to claim 2, wherein a swivelling axis of the swivel flap extends in parallel to the boundary edge of the second air outlet facing the first air outlet and is fixed at a distance from this boundary edge on the housing offset toward the first air outlet.

5. A system according to claim 4, wherein, in a second swivelling position, the swivel flap completely covers the second air outlet.

6. A system according to claim 2, wherein a swivelling axis of the swivel flap extends in parallel to the boundary edge of the third air outlet facing the first air outlet and is fixed at a distance therefrom on the housing offset toward the first air outlet.

7. A system according to claim 6, wherein, in the second swivelling end position, the swivel flap completely covers the third air outlet.

8. A system according to claim 4, wherein the distance of the swivelling axis of the swivel flap from the boundary edge of the second air outlet is less than 5 mm.

9. A system according to claim 6, wherein the distance of the swivelling axis of the swivel flap from the boundary edge of the third air outlet is less than 5 mm.

10. A system according to claim 4, further comprising an additional air flap for the third air outlet, wherein a distance of a swivelling axis of the swivel flap from the boundary edge of the second air outlet is 13 to 23 mm.

11. A system according to claim 10, wherein a swivelling axis of the additional swivel flap extends in parallel to the boundary edge of the third air outlet facing the first air outlet and is fixed on the housing such that it can be swivelled into the interior of the housing.

12. A system according to claim 11, wherein, in a first swivelling end position, the additional air flap completely covers the third air outlet.

13. A system according to claim 1, wherein, in the first swivelling end position, the swivel flap covers approximately half the opening cross-section of the first air outlet.

14. A system according to claim 1, wherein:

the air inlet is connected to an air feeding duct;

the first air outlet is connected to a lower outflow opening of a center nozzle;

the second air outlet is connected to an upper outflow opening of the center nozzle; and the third air outlet is connected to a lateral nozzle.

15. A system according to claim 1, having two third air outlets arranged in the housing mirror-symmetrically with respect to a housing axis aligned with a normal line of the air inlet.

16. A system according to claim 1, wherein, for the separate ventilation of a left and a right part of the vehicle interior, another set of first, second and third air outlets and another swivel flap are arranged mirror-symmetrically with respect to a housing axis coinciding with a normal line of the air inlet.

* * * * *